United States Patent
Onimatsu et al.

(10) Patent No.: US 10,870,246 B2
(45) Date of Patent: Dec. 22, 2020

(54) METHOD FOR DETERMINING ADHESION OF FOREIGN MATTER ON GREEN TIRE

(71) Applicant: Sumitomo Rubber Industries, Ltd., Kobe (JP)

(72) Inventors: Hiroyuki Onimatsu, Kobe (JP); Kenichi Nagai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 103 days.

(21) Appl. No.: 16/301,845

(22) PCT Filed: Apr. 21, 2017

(86) PCT No.: PCT/JP2017/015962
§ 371 (c)(1),
(2) Date: Nov. 15, 2018

(87) PCT Pub. No.: WO2017/208663
PCT Pub. Date: Dec. 7, 2017

(65) Prior Publication Data
US 2019/0283350 A1 Sep. 19, 2019

(30) Foreign Application Priority Data
Jun. 1, 2016 (JP) .................. 2016-110285

(51) Int. Cl.
*B29D 30/00* (2006.01)
*G01N 21/88* (2006.01)
(Continued)

(52) U.S. Cl.
CPC ......... *B29D 30/0061* (2013.01); *B29D 30/60* (2013.01); *G01B 11/24* (2013.01);
(Continued)

(58) Field of Classification Search
CPC ............ B29D 30/60; B29D 2030/0675; B29D 2030/0665; B29D 2030/0682;
(Continued)

(56) References Cited

U.S. PATENT DOCUMENTS

| 2004/0000625 A1* | 1/2004 | Ishihara ............ B29D 30/0606 249/141 |
| 2007/0084541 A1 | 4/2007 | Moriguchi et al. |
| 2008/0283166 A1 | 11/2008 | Mafune et al. |

FOREIGN PATENT DOCUMENTS

| JP | 2005-148049 A | 6/2005 |
| JP | 2008-284815 A | 11/2008 |

(Continued)

OTHER PUBLICATIONS

International Search Report for PCT/JP2017/015982 (PCT/ISA/210) dated Jun. 20, 2017.
(Continued)

*Primary Examiner* — Diane D Mizrahi
(74) *Attorney, Agent, or Firm* — Birch, Stewart, Kolasch & Birch, LLP

(57) ABSTRACT

To reliably and efficiently make foreign matters adhered onto a green tire formed by a strip winding method. It comprises a raw data acquiring step Sa in which raw three-dimensional data D0 about an examination surface 3 are created through rotation of a green tire T and through irradiation with sensor light 2L in an X direction by a two-dimensional displacement sensor 2; an averaging processing step Sb in which processed three-dimensional data D1 are obtained by averaging processing the raw three-dimensional data D0; and an imaging step Sc in which the distance data z in the processed three-dimensional data D1 are each binarized, and an image is created from the binarized processed three-dimensional data D2. The widths Wx and Wy of a range K of the averaging process are set to be
(Continued)

greater than a spiral pitch P of a rubber strip G and less than a width Gw of the rubber strip G.

8 Claims, 6 Drawing Sheets

(51) Int. Cl.
| | |
|---|---|
| *G01N 21/94* | (2006.01) |
| *G06T 7/00* | (2017.01) |
| *G06T 17/00* | (2006.01) |
| *G01B 11/30* | (2006.01) |
| *B29D 30/60* | (2006.01) |
| *G01B 11/24* | (2006.01) |

(52) U.S. Cl.
CPC ......... *G01B 11/30* (2013.01); *G01N 21/8851* (2013.01); *G01N 21/94* (2013.01); *G06T 7/0004* (2013.01); *G06T 17/00* (2013.01); *G06T 2207/10016* (2013.01)

(58) Field of Classification Search
CPC .......... B29D 2030/726; B29D 30/0606; B29D 30/0661; B29D 30/26; B29D 30/38; B29D 30/58; B29D 2030/082; B29D 2030/105; B29D 30/56; B29D 30/66; B29D 30/68; B29D 30/0061; G01B 11/30; G01B 11/24; G01N 21/8851; G01N 21/94; G06T 7/0004; G06T 17/00; G06T 2207/10016
See application file for complete search history.

(56) References Cited

FOREIGN PATENT DOCUMENTS

| JP | 2014-74590 A | 4/2014 |
|---|---|---|
| JP | 2015-229438 A | 12/2015 |
| WO | WO 2010/008067 A1 | 1/2010 |

OTHER PUBLICATIONS

Written Opinion of the International Searching Authority for PCT/JP2017/015962 (PCT/ISA/237) dated Jun. 20, 2017.
Extended European Search Report for European Application No. 17806223.8, dated Dec. 10, 2019.

* cited by examiner

METHOD FOR DETERMINING ADHESION OF FOREIGN MATTER ON GREEN TIRE

TECHNICAL FIELD

The present invention relates to a determining method for determining whether a foreign matter is adhered on a green tire formed by a strip winding method.

BACKGROUND ART

Recently, there has been proposed a so-called strip wind method for forming constructional rubber components constituting a tire outer skin, for example, a tread rubber, a sidewall rubber and the like, by spirally winding an unvulcanized rubber strip. (cf. Patent Documents 1, 2)

In the strip winding method, the rubber strip has a tendency to bunch up together into a mass in the winding start end and the winding finishing end of the rubber strip. The outer surface of a green tire has a high tackiness. Therefore, there is a tendency that cut pieces of the rubber strip cut out during forming the green tire adhere onto the outer surface. When a green tire is vulcanized together with foreign matters such as the mass and cut pieces of the rubber strip remained adhered, there is a possibility that the tire quality is lowered.

It is however difficult to discriminate foreign matters by the use of a displacement sensor since the outer surface of the green tire has fine step-like unevenness due to the spiral winding of the rubber strip. Therefore, conventionally, the discrimination of the foreign matters is made through visual observation by an inspector. Thus, the reliability is low, and the work efficiency of the inspection becomes low.

PRIOR ART DOCUMENT

Patent Document

Patent Document 1: Japanese Patent Application Publication No. 2008-284815
Patent Document 2: Japanese Patent Application Publication No. 2015-229438

SUMMARY OF THE INVENTION

Problems to be Solved the Invention

In the present invention, it is a problem to provide a method for determining the adhesion of a foreign matter on a green tire which can reliably and efficiently determine whether foreign matters such as mass and cut pieces of a rubber strip are adhered on a green tire formed by a strip winding method.

Means for Solving the Problems

The present invention is a determining method for determining the adhesion of a foreign matter on the outer surface of a green tire which outer surface is formed by spirally winding a rubber strip, comprises a raw data acquiring step in which an examination surface of the outer surface of the green tire is scanned in the circumferential direction with a two-dimensional displacement sensor, and a raw three-dimensional data D0 of the examination surface is created, an averaging processing step in which, by averaging processing distance data z in the raw three-dimensional data D0, processed three-dimensional data D1 are obtained, an imaging step in which distance data z in the processed three-dimensional data D1 are each binarized at a threshold, and an image is created, a determining step in which, based on the data about the created image, whether a foreign matter is adhered is determined, wherein in the raw data acquiring step, the green tire is rotated about its axis, and the two-dimensional displacement sensor irradiates the examination surface of the rotating green tire with a sensor light which is linear and elongate in X direction perpendicular to the circumferential direction, thereby, the raw three-dimensional data D0 made up of position data x in the X direction, position data y in the circumferential direction, and the distance data z from the two-dimensional displacement sensor to the examination surface, are created, in the averaging processing step, with respect to the raw three-dimensional data D0, for each of the distance data z, the averaging process is made over a range having a width Wx in the X direction and a width Wy in the circumferential direction, thereby, processed three-dimensional data D1 are obtained, wherein each of the width Wx and the width Wy is larger than a spiral pitch of the rubber strip and is smaller than the width of the rubber strip.

Effect of the Invention

As described above, in the present invention, the averaging processing is made on the raw three-dimensional data D0 about the examination surface obtained from the rotating green tire and the two-dimensional displacement sensor.

The width Wx in the X direction and the width Wy in the circumferential direction of the range on which the averaging processing is made, are set to be larger than the spiral pitch of the rubber strip and less than the width of the rubber strip. Thereby, the fine stepped unevenness due to the spiral winding of the rubber strip can be eliminated and smoothed. Further, it is possible to flatten the examination surface.

Further, the distance data z in the averaged processed three-dimensional data D1 are binarized at the threshold, and from the binarized three-dimensional processed data D2, the image is created. Therefore, it is possible to visualize and capture the size of the foreign matter, and it becomes possible to easily determine the adhesion of the foreign matter.

MODE FOR CARRYING OUT THE INVENTION

Hereinafter, an embodiment of the present invention will be described in detail.

Figure 1:
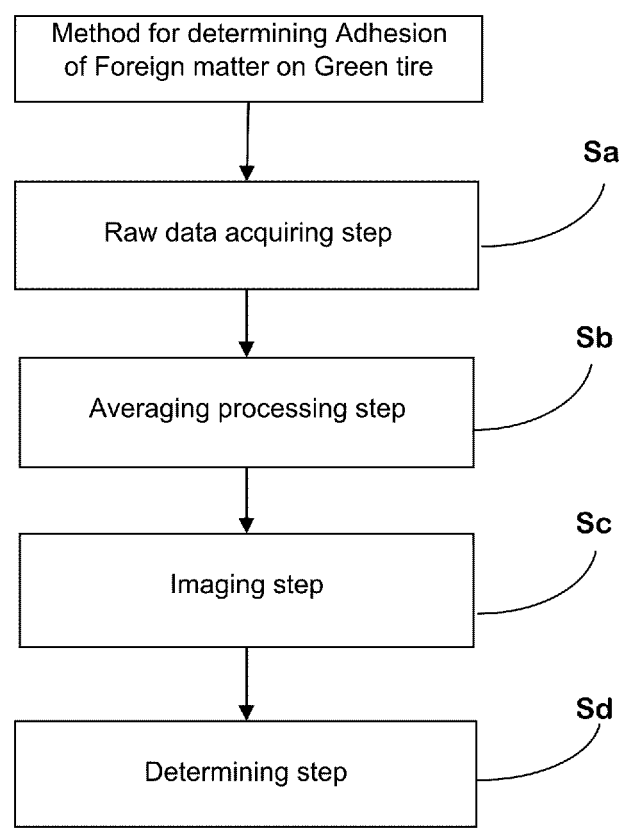
FIG. 1 is a flowchart of the method for determining the adhesion of a foreign matter on a green tire according to the present invention.

As shown in FIG. 1, the method for determining the adhesion of a foreign matter on a green tire according to the present invention comprises a raw data acquiring step Sa, an averaging processing step Sb, an imaging step Sc, and a determining step Sd.

Figure 2A:
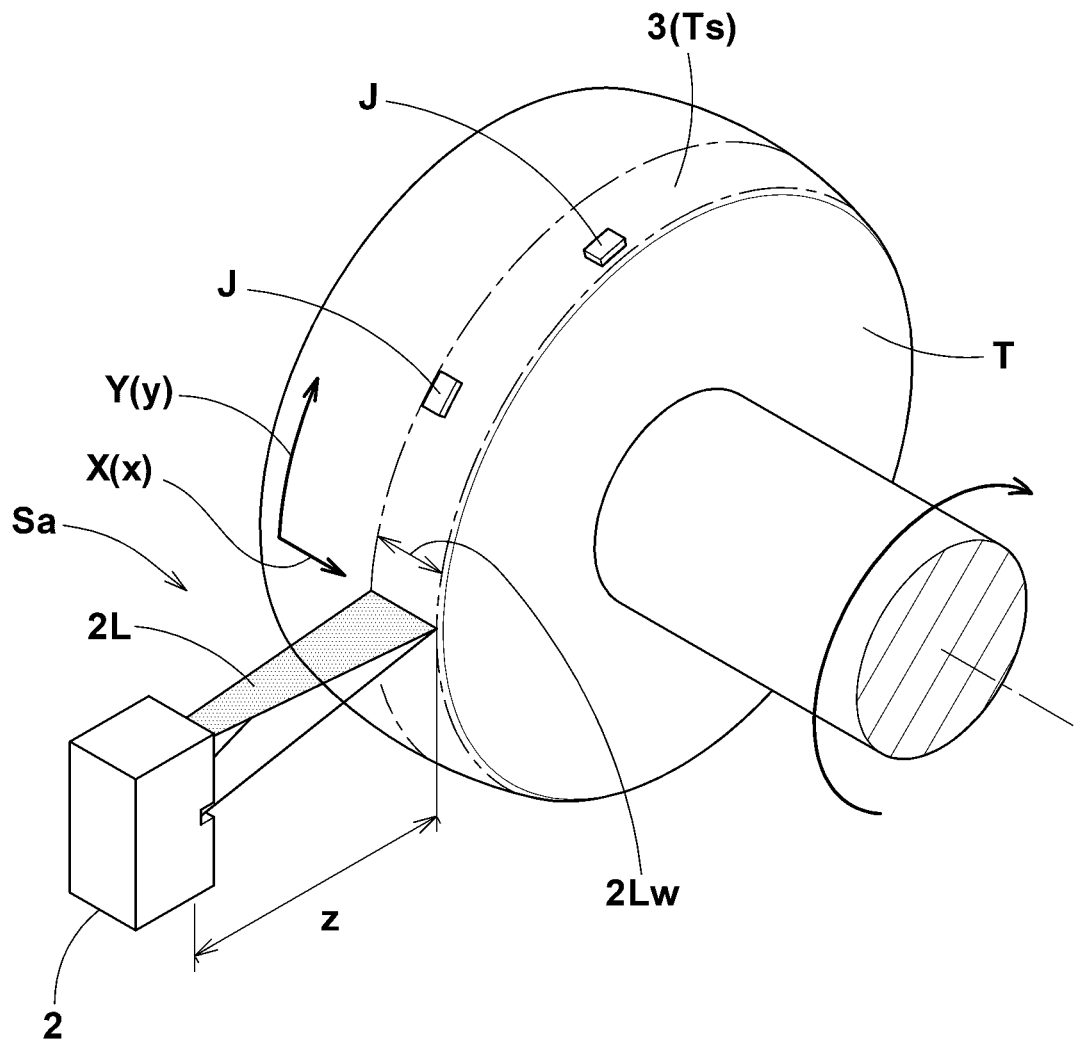
FIG. 2(A) is a perspective view conceptually showing the raw data acquiring step, step.
Figure 2B:
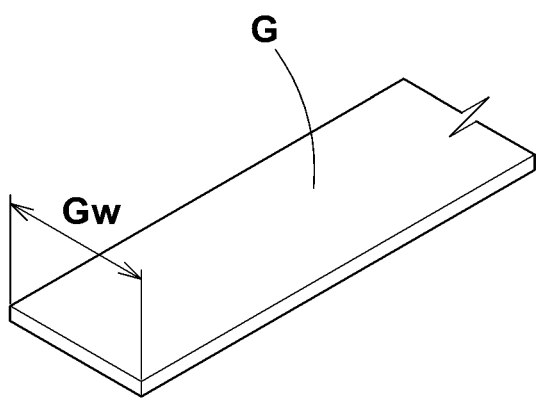
FIG. 2(B) is a perspective view conceptually showing the rubber strip.

As shown in FIG. 2 (A), the method for determining the adhesion of a foreign matter determines the presence or absence of foreign matters J adhered to an outer surface Ts of a green tire T.

In the green tire T, at least one of rubber components constituting the outer skin of the tire, for example, a tread rubber, a sidewall rubber and the like, is formed by spirally winding an unvulcanized rubber strip G (shown in FIG. 2 (B)). Therefore, in the outer surface of the tire formed from the rubber strip G, fine stepped unevenness 10 (shown in FIG. 4 (A)) is formed.

In the raw data acquiring step Sa, as shown in FIG. 2 (A), an examination surface 3 of the outer surface Ts of the green tire T is scanned in the circumferential direction Y by the use of a two-dimensional displacement sensor 2. Specifically, the green tire T is rotated about its axis. The two-dimensional displacement sensor 2 irradiates the examination surface 3 of the rotating green tire T with a sensor light 2L which is linear and elongate in the X direction perpendicular to the circumferential direction Y.

Thereby, there is created raw three-dimensional data D0 about the examination surface 3 which consist of position data x in the X direction, position data y in the circumferential direction Y, and distance data z from the two-dimensional displacement sensor 2 to the examination surface 3.

The two-dimensional displacement sensor 2 is a so-called laser displacement sensor radiating a line-shaped sensor light 2L, and commercially available various sensors can be used.

In this example, a two-dimensional displacement sensor 2 whose irradiation width 2Lw is for example 60 to 80 mm is used.

Figure 3:
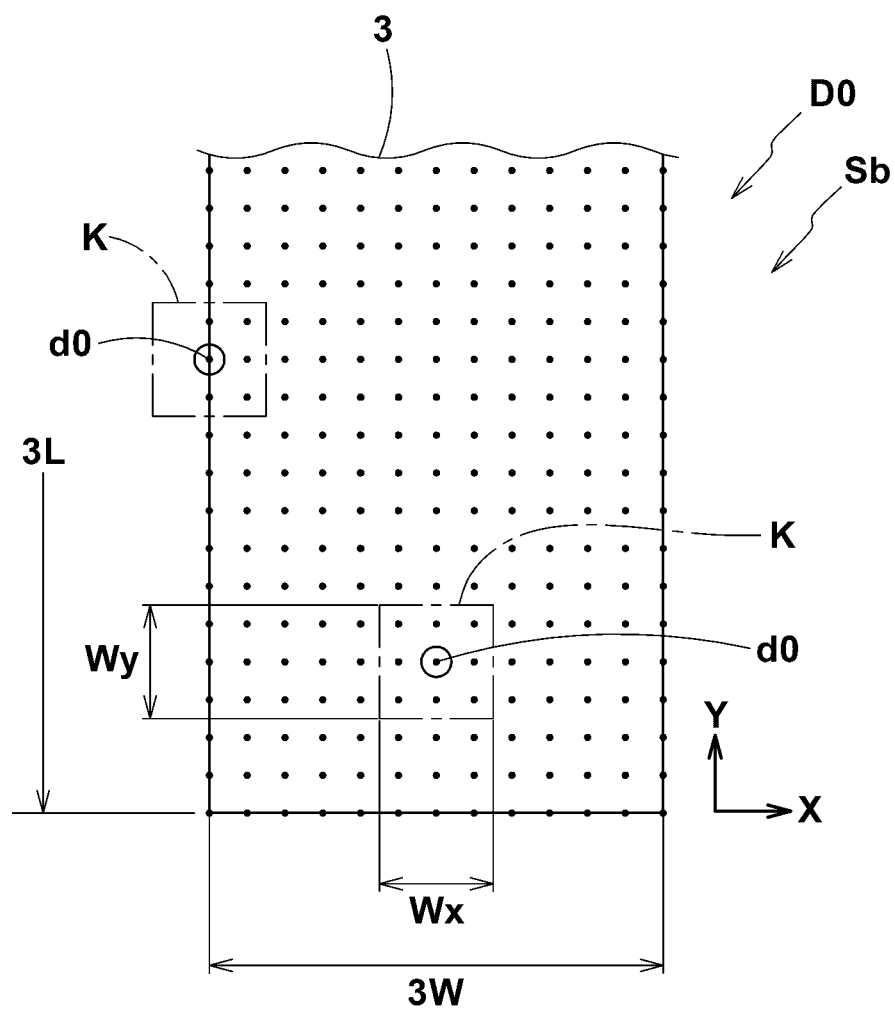
FIG. 3 is a diagram conceptually showing the averaging processing step.

In the averaging processing step Sb, as shown conceptually in FIG. 3, with respect to the raw three-dimensional data D0, for each of the distance data z, an averaging process is made over a range K having a width Wx in the X direction and a width Wy in the circumferential direction, and thereby, processed three-dimensional data D1 are obtained.

The raw three-dimensional data D0 are a set of data pieces d shown as dots in FIG. 3.

In this example, the examination surface 3 has a width 3W in the X direction of 70 mm, and a length 3L in the circumferential direction Y of 2000 mm, and the data about this examination surface 3 are obtained at intervals of 0.0875 mm in the X direction, and intervals of 0.125 mm in the circumferential direction Y.

Accordingly, the raw three-dimensional data D0 in this example are a set of 800×16000 data pieces d.

In FIG. 3, the distance datum z of each data piece d is expressed as a height of the dot (not shown).

In the averaging processing, there are averaged the distance data z of all the data pieces d (including a data piece d0) positioned within a range K centered on the data piece d0 in the plurality of the data pieces d.

The distance datum z in the data piece d0 before averaged is replaced by the averaged distance datum z1.

This is performed on each of the data pieces d in the raw three-dimensional data D0.

Thereby, processed three-dimensional data D1 are obtained. The same is applied to the data pieces d0 positioned at both ends in the X direction.

Figure 4A:
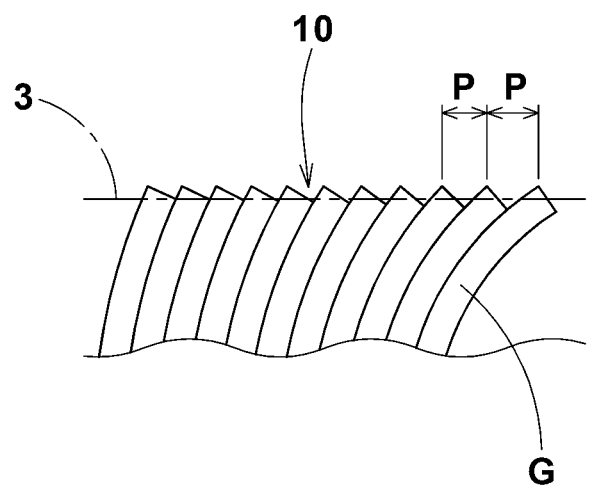
FIGS. 4(A) and 4(B) are diagrams conceptually showing the effect of the averaging processing step.
Figure 4B:
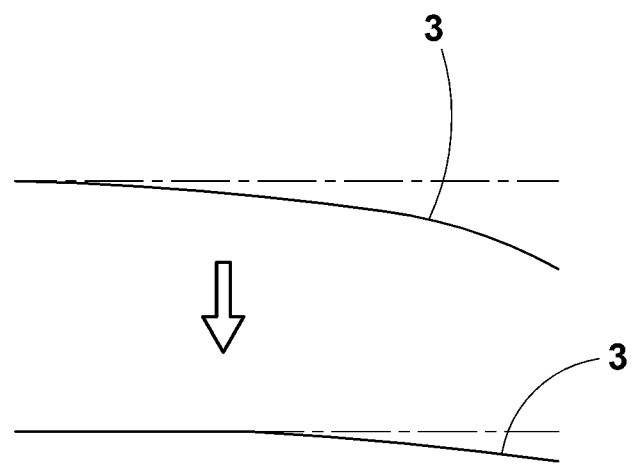

The width Wx in the X direction and the width Wy in the circumferential direction of the range K are set to be large than the spiral pitch P (shown in FIG. 4 (A)) of the rubber strip G and smaller than the width Gw (shown in FIG. 2 (B)) of the rubber strip G. When the spiral pitch P is varied, the minimum spiral pitch P is applied.

Thereby, the unevenness 10 of the examination surface 3 due to the spiral winding of the rubber strip G can be eliminated and smoothed as shown in FIG. 4 (A).

Figure 6:
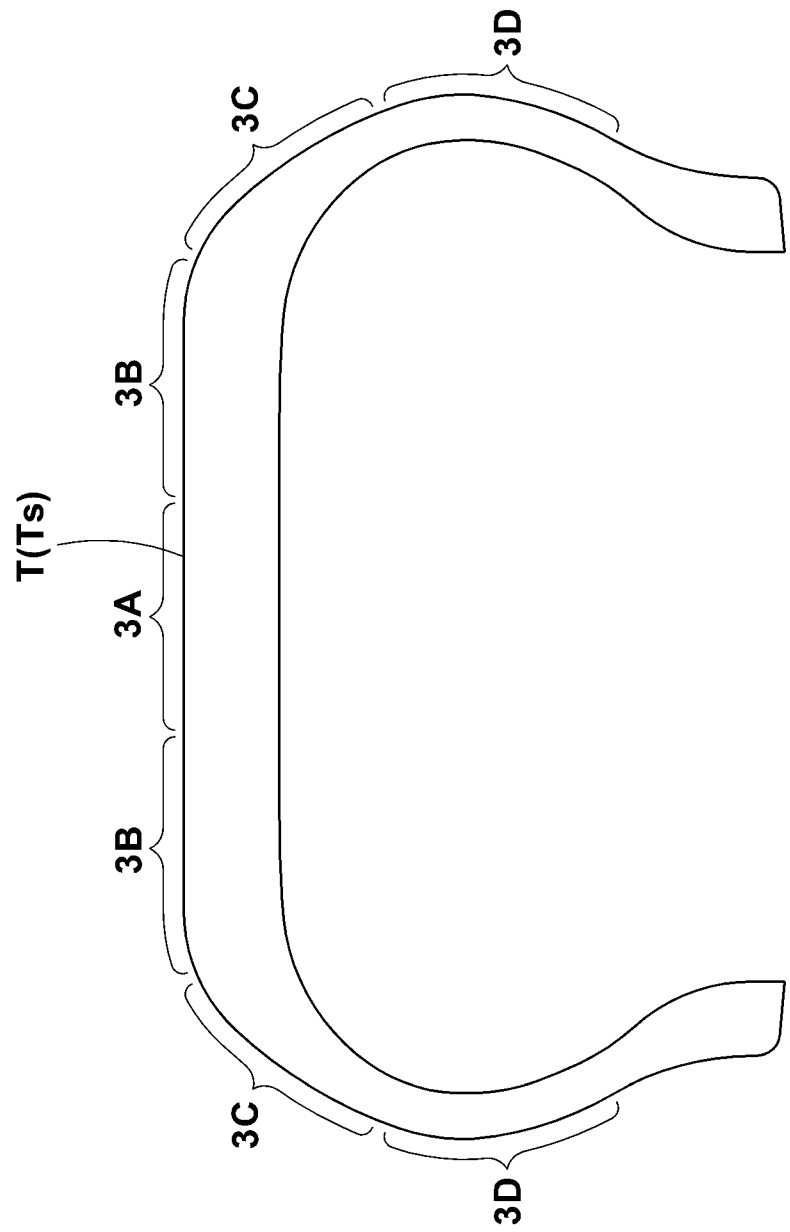
FIG. 6 is a sectional view showing an example of sections of the outer surface of the green tire.

Further, the smoothed examination surface 3 can be more flattened as shown in FIG. 4 (B). In order to flatten, it is preferred that the outer surface Ts of the green tire T is divided into, for example, seven sections, an examination surface 3A on a tread center side, examination surfaces 3B, 3B on tread shoulder sides, examination surfaces 3C, 3C on sidewall upper sides, and examination surfaces 3D, 3D on sidewall lower sides as shown in FIG. 6. Then, sets of the raw three-dimensional data D0 of the examination surfaces 3A to 3D are respectively acquired by separate two-dimensional displacement sensors 2. That is, it is preferable that the outer surface Ts of the green tire T is divided into a plurality of the examination surfaces 3 in which the profile change becomes small. It is preferable that the number of divisions is 7 or more.

Figure 5:
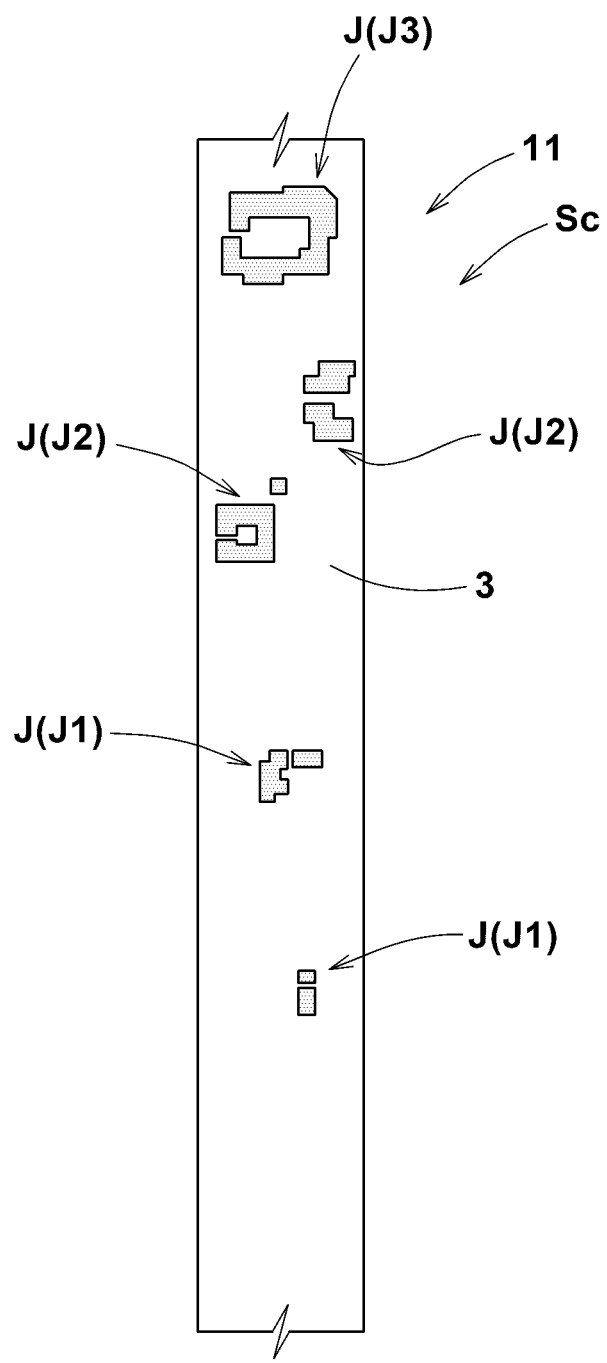
FIG. 5 is an image of the three-dimensional processed data D2 created by the imaging step.

In the imaging step Sc, each of the distance data z of the processed three-dimensional data D1 is binarized at a threshold. Then, from the binarized three-dimensional processed data D2, an image is created. Thus, it is possible to obtain image data 11 for example as shown in FIG. 5.

The creating of the image can be made by converting the binarized three-dimensional processed data D2 into pixel data.

In the image data 11, the foreign matters J are expressed by a difference of color including, for example, chroma, hue and brightness, while hiding the unevenness 10 due to the rubber strip G, and the sizes are visualized to be captured. Preferably, the threshold is at least 200% of the thickness of the rubber strip G.

By adjusting the width Wx and the width Wy, the size of the foreign matter J appearing can be adjusted.

In the determining step Sd, based on the image data 11, whether the foreign matter J is adhered, is determined.

The determination can be made through visual observation by an inspector. But, it is preferable that the determination is made automatically through an image analysis of the pixel area and the like of the appearing portion of the foreign material J.

While detailed description has been made of an especially preferable embodiment of the present invention, the present invention can be embodied in various forms without being limited to the illustrated embodiment.

Example

Using a rubber strip G, a tire outer skin of a green tire T was formed. Then, by applying a foreign matter J1 (10 mm×10 mm×2.0 mm), a foreign matter J2 (20 mm×20 mm×2.0 mm) and a foreign matter J3 (30 mm×30 mm×2.0 mm) onto an examination surface 3B on the tread shoulder side of the green tire T, a sample tire was prepared. And the image data 11 shown in FIG. 5 was obtained by the method for determining the adhesion of a foreign matter according to the present invention.
rubber strip G: width Gw=23 mm, thickness=1.0 mm
two-dimensional displacement sensor: LJ-V7200 manufactured by Keyence Corporation Ltd.
laser beam irradiation width: 70 mm
resolution: X direction 0.0875 mm (70 mm/800 points), circumferential direction Y 0.125 mm (2000 mm/16000 points)
averaging processed range K: width Wx=5 mm, width Wy=5 mm It was possible to obtain the image data 11 as shown in FIG. 5 in which the foreign matters J1 to J3 could be identified.

DESCRIPTION OF THE REFERENCE NUMERALS 2 two-dimensional displacement sensor
2L sensor light
3 examination surface
G rubber strip
J foreign matter
K range
P spiral pitch
Sa raw data acquiring step
Sb averaging process step
Sc imaging step
Sd determining step
T green tire

The invention claimed is:

1. A method for determining the adhesion of a foreign matter which is a determining method for determining whether a foreign matter is adhered on an outer surface of a green tire which outer surface is formed by spirally winding a rubber strip, comprising:
a raw data acquiring step in which an examination surface of the outer surface of the green tire is scanned in the circumferential direction with a two-dimensional displacement sensor, and a raw three-dimensional data D0 of the examination surface is created,
an averaging processing step in which by averaging processing distance data z in the raw three-dimensional data D0, processed three-dimensional data D1 are obtained,
an imaging step in which distance data z in the processed three-dimensional data D1 are each binarized at a threshold, and an image is created, and
a determining step in which, based on the data about the created image, whether a foreign matter is adhered is determined,
wherein
in the raw data acquiring step,
the green tire is rotated about an axis thereof, and the two-dimensional displacement sensor irradiates the examination surface of the rotating green tire with a sensor light which is linear and elongate in X direction perpendicular to the circumferential direction, thereby,
the raw three-dimensional data D0 made up of position data x in the X direction, position data y in the circumferential direction, and the distance data z from the two-dimensional displacement sensor to the examination surface,
are created, and
in the averaging processing step,
with respect to the raw three-dimensional data D0, for each of the distance data z, the averaging process is made over a range having a width Wx in the X direction and a width Wy in the circumferential direction, thereby, processed three-dimensional data D1 are obtained,
wherein
each of the width Wx and the width Wy is larger than a spiral pitch of the rubber strip and is smaller than the width of the rubber strip.

2. The method for determining the adhesion of a foreign matter as set forth in claim 1, wherein the outer surface of the green tire is divided into a plurality of examination surfaces.

3. The method for determining the adhesion of a foreign matter as set forth in claim 2, wherein the examination surfaces are an examination surface 3A on a tread center side,
a pair of examination surfaces on tread shoulder sides,
a pair of examination surfaces on sidewall upper sides, and
a pair of examination surfaces on sidewall lower sides.

4. The method for determining the adhesion of a foreign matter as set forth in claim 2, wherein the examination surfaces are scanned in the respective circumferential directions with separate two-dimensional displacement sensors prepared for the respective examination surfaces.

5. The method for determining the adhesion of a foreign matter as set forth in claim 1, wherein
the threshold is at least 200% of the thickness of the rubber strip G.

6. The method for determining the adhesion of a foreign matter as set forth in claim 3, wherein the examination surfaces are scanned in the respective circumferential directions with separate two-dimensional displacement sensors prepared for the respective examination surfaces.

7. The method for determining the adhesion of a foreign matter as set forth in claim 2, wherein
the threshold is at least 200% of the thickness of the rubber strip G.

8. The method for determining the adhesion of a foreign matter as set forth in claim 3, wherein
the threshold is at least 200% of the thickness of the rubber strip G.

* * * * *